(12) United States Patent
Harris

(10) Patent No.: US 11,611,437 B2
(45) Date of Patent: Mar. 21, 2023

(54) BLOCKCHAIN TOKEN HOLDING SOCIAL EVENT HISTORY

(71) Applicant: Scott C Harris, San Diego, CA (US)

(72) Inventor: Scott C Harris, San Diego, CA (US)

( * ) Notice: Subject to any disclaimer, the term of this patent is extended or adjusted under 35 U.S.C. 154(b) by 210 days.

(21) Appl. No.: 16/948,225

(22) Filed: Sep. 9, 2020

(65) Prior Publication Data

US 2021/0083874 A1     Mar. 18, 2021

Related U.S. Application Data

(60) Provisional application No. 62/901,699, filed on Sep. 17, 2019.

(51) Int. Cl.
| | |
|---|---|
| *H04L 9/32* | (2006.01) |
| *H04L 9/06* | (2006.01) |
| *G06F 16/27* | (2019.01) |
| *H04L 9/00* | (2022.01) |

(52) U.S. Cl.
CPC ............ *H04L 9/3213* (2013.01); *G06F 16/27* (2019.01); *H04L 9/0637* (2013.01); *H04L 9/50* (2022.05)

(58) Field of Classification Search
CPC ....... H04L 9/3213; H04L 9/0637; H04L 9/50; H04L 9/3239; H04L 9/3297; G06F 16/27; G06F 16/22
See application file for complete search history.

(56) References Cited

U.S. PATENT DOCUMENTS

| | | | |
|---|---|---|---|
| 9,730,022 B1 * | 8/2017 | Chafni | G07C 9/257 |
| 11,269,859 B1 * | 3/2022 | Luedtke | G06F 16/245 |
| 2013/0060641 A1 * | 3/2013 | Al Gharabally | G06Q 30/02 |
| | | | 705/14.66 |
| 2014/0163934 A1 * | 6/2014 | Zhang | G06Q 10/06 |
| | | | 703/2 |
| 2015/0317057 A1 * | 11/2015 | Choi | G01C 21/3673 |
| | | | 715/757 |
| 2018/0182014 A1 * | 6/2018 | Cheng | G06Q 30/0631 |
| 2019/0073487 A1 * | 3/2019 | Rong | G06F 21/64 |
| 2019/0156938 A1 * | 5/2019 | Brunner | H04L 9/0643 |
| 2019/0384968 A1 * | 12/2019 | Brown | G06V 20/52 |
| 2020/0134760 A1 * | 4/2020 | Messerges | G07C 13/00 |
| 2020/0184739 A1 * | 6/2020 | Nathan | G06Q 10/20 |
| 2020/0387432 A1 * | 12/2020 | Kamijoh | G06F 11/1469 |

FOREIGN PATENT DOCUMENTS

EP         3669263 B1 *   3/2022   ......... G06F 16/2365

* cited by examiner

*Primary Examiner* — Mohammed Waliullah

(57) ABSTRACT

A crypto token wallet which allows storing reduced size ledgers.

16 Claims, 1 Drawing Sheet

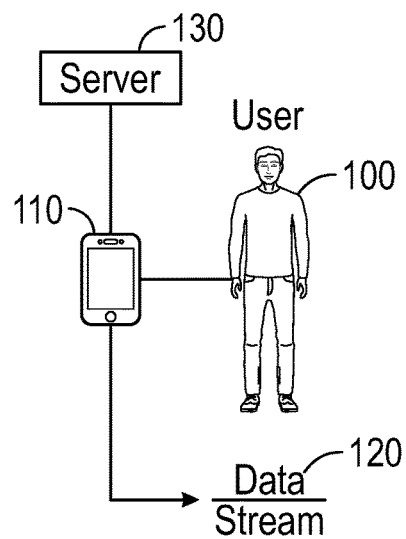
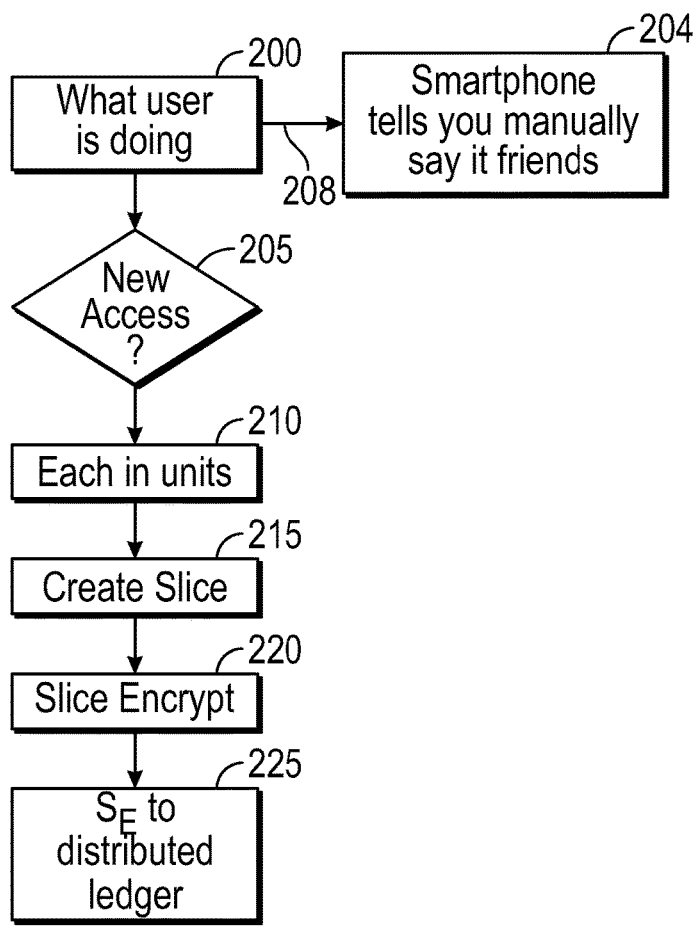
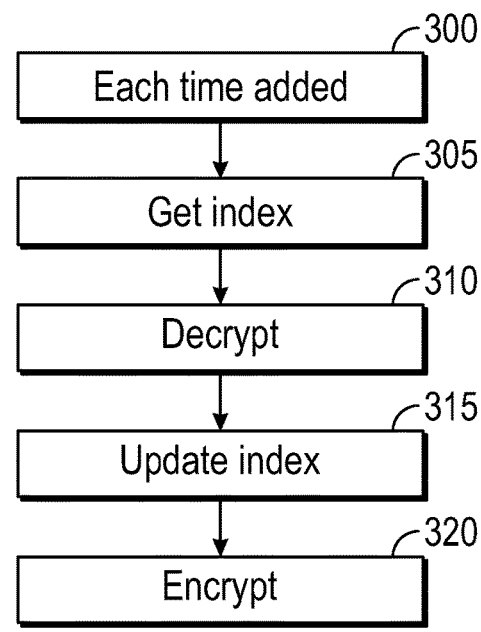
FIG. 1
FIG. 2
FIG. 3

BLOCKCHAIN TOKEN HOLDING SOCIAL EVENT HISTORY

This application claims priority from provisional No. 62/901,699, filed Sep. 17, 2019, the entire contents of which are herewith incorporated by reference.

BACKGROUND

In the modern age, people rarely go anywhere without their smart phone or other portable computing device. The portable computing device can thus get a lot of information about what happens in your day-to-day life. However, privacy concerns have typically prevented people from allowing their smart phone to maintain constant data about people's whereabouts.

SUMMARY

The inventor recognizes that the use of asymmetrical encryption, such as a private/public key encryption, can allow user to encrypt information from their smart phone in a way that allows them (but only them or their designee) to obtain this information. In addition, the more prevalent use of distributed ledger systems such as blockchain can be used to verify the veracity any information that is obtained.

According to embodiments, an electronic device is used to obtain information about a user's activities, including social activities and all other activities that a user carries out that can be obtained by an electronic device. The information is encrypted using the user's public key, in a way that can only be decrypted using the user's private key. The encrypted data is stored in a distributed ledger along with cryptographically secure information which ensures that the information came from the desired source. In one embodiment, the person's activities are associated with a token, such as a blockchain token. The distributed ledger thus forms an ascertainable record of what people have done day by day.

BRIEF DESCRIPTION OF THE DRAWINGS the drawings show aspects of the invention as described herein, and specifically, FIG. 1 shows a stream of data between the user, there phone, and their server;

FIG. 2 shows a flowchart of operation; and

FIG. 3 shows a flowchart of adding the information.

DETAILED DESCRIPTION

An embodiment is illustrated with reference to FIG. 1, in which a user 100 carries out information exchange and other activities on their smart phone 110, which is shown having a camera and screen. All of the different things which can be done or sensed on the smart phone can be included within the data stream 120. According to an embodiment, the smart phone 110, either by itself or in conjunction with a remote server 130, carries out the flowchart shown in FIG. 2.

First, at 200, the processor (which can be in the phone 110, the server 130, or in some other distributed processor), determines what the user is doing either at any moment, or any previous moment. The system contemplates this being done in a number of different ways.

A first way is that the smart phone automatically decides what a person is doing, e.g., by using its intelligence and knowledge of the surroundings and person-actions.

A second way occurs when a user manually tells the smartphone what the user is doing.

A third way carries out finding a person's actions by interaction with in "friend" on the social network. Each of these will be discussed herein.

For the first, where the actions are automatically found from the smart phone, is shown at, where the smartphone knows that the user has done a number of different things. For example, the smart phone can keep track of its different activities at different times. As an example, the smartphone can indicate that a user was at GPS value x, and/or Wi-Fi value y, and/or cell tower z, from time t1 to t2. While there, the phone notes things that the user did. These can include walk/run/exercise (determined from the phone), take pictures, had the following heart rate, coordinated with emails, checked in, or other things.

The system can also determine from the GPS and Wi-Fi and cell tower what kind of place is at the location where the user was. For example, if this was a store, the system can identify if the user used a credit card at the store, by determining if the user received a credit card charge notification from that store. If the location was a doctor's office, the user the system can identify if the user had an appointment (from the phone calendar) at the doctor. This can also look for photos, check ins, using credit card charges, photos taken, comments on a social network, and others, to determine what the user was doing.

In this way, phone can determine various things that the user has done automatically, and can use many of the different things it knows to figure this out such as 'I was grocery shopping', 'I was at a restaurant', 'I was at a doctor appointment' or the like.

These are all collectively shown as 201, the smart phone tells.

However, maybe no computer can figure out what the user is doing at a certain time. In this case, at 202, the user can tell the phone/system what was happening during these times, either contemporaneously, at the end of day, or at some other time when it is desirable to round out the social itinerary. For example at some time during the operation the phone can query the user with "I can't figure out what you were doing, do you want to tell me?" At this point the user could choose from a pulldown menu, or enter a narrative, take a picture, or do something else to tell the smart phone what you did.

Another alternative is by finding out when the user is with friends, what their friends were doing and trying to correlate that way. The bottom line from 200 is that the system tries, hour by an hour, to figure out what the user did each time each day and each time of each day.

This stream of information is a very powerful stream of information, and needs to be kept secret which is done as described herein.

However, at 205, the system determines if the user wants to allow any accesses to this information. Users may provide access to information for example on a social network. The user can friend another on a social network and decide if they can opt into a shared moment by moment characterization of things that the user did. For example, the user may choose to share their whole moment by moment operation with other users or just part of that operation. This can also be segmented by time, so that someone else is given access to your data by date, time. This can be done when two people are together for a time, for example, then the user can share with that person the moment by moment for the time they were together. If 2 people mutually share each other's information, then the two smart phones can coordinate the information together to try and find more information about what a user was doing from their companions information.

This activity can give other users access to the data for the date and time they were together as described above. In addition, this can be used for example any time you're at a restaurant, anytime you're at a grocery, anytime you're at the doctor, or the like, to share the information only during that segmented activity time.

After allowing the accesses at 205, the system carries out for each social item you've done, creating a "token" from the information. The token which is described herein could be a blockchain token of a blockchain system that is already known or later described, or can be a new blockchain system. The information can be a combination of all the electronic data that this system has collected for each slice of time made as part of a single nonfungible token, or part of multiple different tokens at multiple different times. This can include the user's activities, and also can include the user's posts on social networks such as Facebook posts, Instagram pictures, in general all slices of life.

As an alternative to the actual data being used in this "slice" variable, only a slice of it could be stored, which is formed by a hash of the original information. This forms a verification of the actual information and in essence forms an alibi for a person to verify their locations if desired. Each unit of time, for example each minute, hour or whatever time is set at 210 has a slice is created at 215. The slices forms a snapshot of the users life at that time.

At 220, the slice is encrypted along with a timestamp and other information verifying the time of the slice. The encryption is carried out using the user's public key, so it can be encrypted by anyone who has that public key. However, the slice can only be decrypted using the private key which is available only to the user itself.

At 225 and the encrypted slice referred to herein as $S_E$, is added to a distributed ledger system with at least one encryption style checksum such as a hash, a block or some other means of verification.

This forms a record of the user's life that no one else can get to, and that provides, if necessary, both a memory reminder to help the user remember the good and bad times in the users life, and also forms an "alibi" if necessary.

According to an embodiment, this data is also indexed very carefully so that the user can use this to find certain things. For example, each the user can query the data for "each time I was at Hamburger Mary's", "I want any pictures".

FIG. 3 illustrates this operation. Each time (after the first time when there is no index at all) something is added at 300, there is an existing index. At 305, the previous index, is received. The index is decrypted at 310 using the user's private key. The index is then updated at 315, using any metadata or any other information that is included within the slice. After this, the index is again encrypted at 320.

The index need not be added to the ledger, but rather can be just a large index of information which refers to information that is in the distributed ledger. Moreover, since the index need not be added to the ledger, this does not need to be done in real time and again can rely on the user, if necessary, manually entering information about the activities.

For the first time, this allows users to record their activities with impunity without giving up their privacy. All of the data of the user's information is encrypted, so that no one else can get it. The information is added to a Blockchain, in a way that cryptographically verifies its authenticity. A distributed ledger system verifies the Blockchain and the time that the information was added to the Blockchain. However, only the actual user of the information with their actual private key can decrypt this information and use it. Therefore even though the information has been verified and is ascertainable, the information can only be used by the user.

Although only a few embodiments have been disclosed in detail above, other embodiments are possible and the inventors intend these to be encompassed within this specification. The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A programmed portable device, comprising:
a portable computer device, operating using a battery, and a processor, and having a wireless communication capability, the portable computer device having the ability to determine at least a location of a user;
the portable computer device creating, at specified index time points, information representing what a user is doing at times associated with the specified index time points;
the portable computer device encrypting the information about what the user is doing at the times, and adding the encrypted data to a ledger file along with cryptographically secure information which ensures that the information is secure and was actually created at a specified time;
the computer device creating an index to the ledger file, the index including the ability to find information about the user's activities from the ledger file,
wherein the portable computer device operates to encrypt the index, and to operate on new information added to the ledger file, the portable computer device operating to decrypt the index, updating the index with index information about the new information added to the ledger file, and then to encrypt the index which includes the updated information.

2. The computer device as in claim 1, wherein the index file is in a form that allows a user querying data for information about each time the user was at a specific location, to return information from the index about each time the user was at the specific location.

3. The computer device as in claim 1, wherein the specified index time points are specified intervals of time throughout the user's day and the portable computer device creating, at each of the index time points, information representing what a user is doing at times associated with the specified index time points.

4. The computer device as in claim 1, wherein the specified index time points are set each time the user arrives at a new location and the portable computer device creating, at each of the index time points, information representing what a user is doing at times associated with the specified index time points.

5. The computer device as in claim 1, wherein at least one of the parts of the information is verified by the portable computer device's automatic detection of information.

6. The computer device as in claim 5, wherein at least one of the parts of information is verified by detecting an action of another friend on a social network.

7. The computer device as in claim 1, wherein the portable computer device is a portable phone.

8. A method of creating a moment by moment characterization of what a user is doing, comprising:
- using a portable computer for receiving and storing moment by moment characterizations of what the user is doing as a stream of information;
- the moment by moment characterizations including at least an automatic detection of location of the user,
- creating an encrypted sequence from the stream of information, the encrypted sequence including at least a plurality of slices, each slice representing one of the characterizations, the encrypted sequence including a timestamp associated with the slice, and the encrypted sequence including other information verifying the slice; and
- creating an encrypted index to the encrypted sequence, the encrypted index including the ability to find information about the user's activities from the encrypted sequence, where the index file is in a form that allows a user querying data for information about each time the user was at a specific location, to return information from the index about each time the user was at the specific location.

9. The method as in claim 8, wherein the information verifying the slice comprises automatically detected location information.

10. The method as in claim 9, wherein the encrypted sequence is added to a nonfungible block chain token.

11. The method as in claim 8, wherein the information verifying the slice comprises information from a social network indicating actions of others.

12. The method as in claim 8, further comprising updating the index by decrypting at least a portion of the index, adding index information that characterizes contents of a new slice to the index to form an updated index and encrypting the updated index.

13. The method as in claim 8, wherein a new slice is determined each time the user arrives at a new location.

14. A computer system operating for creating a moment by moment characterization of what a user is doing, comprising:
- portable computer programmed for receiving and storing moment by moment characterizations of what the user is doing as a stream of information;
- the portable computer storing an automatic detection of location of the user as one of the moment by moment characterizations; and
- the portable computer creating an encrypted sequence from the stream of information, the encrypted sequence including at least a plurality of slices, each slice representing one of said characterizations, the encrypted sequence including a timestamp associated with the slice, and the encrypted sequence including other information verifying the slice,
- creating an encrypted index to the encrypted sequence, the index including the ability to find information about the user's activities from the encrypted sequence, where the index file is in a form that allows a user querying data for information about each time the user was at a specific location, to return information from the index about each time the user was at the specific location.

15. The system as in claim 14, wherein a new slice is determined each time the user arrives at a new location.

16. The system as in claim 14, wherein the computer operates to update the index by decrypting at least a portion of the index, adding index information that characterizes contents of a new slice to the index to form an updated index and encrypting the updated index.

* * * * *